United States Patent [19]
Weiley

[11] Patent Number: 5,130,879
[45] Date of Patent: Jul. 14, 1992

[54] VIDEO CASSETTE WHICH INDICATES NUMBER OF TIMES PLAYED

[75] Inventor: John F. Weiley, Paddington, Australia

[73] Assignee: Capital Cities/ABC, New York, N.Y.

[21] Appl. No.: 716,559

[22] Filed: Jun. 17, 1991

Related U.S. Application Data

[60] Division of Ser. No. 576,143, Aug. 29, 1990, Pat. No. 5,050,031, which is a continuation-in-part of Ser. No. 160,022, Feb. 24, 1988, abandoned, which is a continuation-in-part of Ser. No. 117,813, Nov. 5, 1987, abandoned, which is a continuation-in-part of Ser. No. 9,340, Apr. 21, 1986, abandoned.

[51] Int. Cl.$^5$ ...................... G11B 23/28; G11B 23/04
[52] U.S. Cl. .................................. 360/132; 360/137; 242/199
[58] Field of Search .............................. 360/132, 137; 242/197–199

[56] References Cited

U.S. PATENT DOCUMENTS 3,995,319 11/1976 Harris ................................. 360/132
4,466,584 8/1984 Chevalier ...................... 360/132 X
4,586,101 4/1986 Vogelgesang ..................... 360/132

Primary Examiner—David J. Severin
Attorney, Agent, or Firm—Curtis, Morris & Safford

[57] ABSTRACT

A computerized video record rental system and method in which a video record unit such as a tape cassette is provided with an integral counting device for counting the number of times the record is played. Upon rental and return of the record, the counts are recorded in computer memory, together with an identification of the record unit, and the computer computes the rental fee due based on the net play count for the record unit. A central computer is provided at a location remote from the rental sites. The computers at the rental sites are connected to the central computer periodically by way of modems and telephone lines. The central computer is similarly linked to computer terminals located at the record owners' places of business. Rental information is gathered from the rental sites in the central computer, which reports rental figures to the owners. An electronic funds transfer network is provided to electronically transfer funds from accounts maintained by the rental retailers to the owners by way of the central computer. The preferred counting device in the video cassette uses caliper arms to detect the position of one of the tape rolls in the cassette at two points on opposite sides of the roll and drives a counter in proportion to changes in the distance between the points. This virtually immunizes the mechanism from false counts due to lateral shifting of the tape reels in the cassette housing during handling of the cassette of a cassette playing machine. An alternative is a hybrid system using a mechanical tape motion sensor and an integral electronic counter and memory, with an LED read-out in a form which is readable by a bar-code scanner.

12 Claims, 13 Drawing Sheets

VIDEO CASSETTE WHICH INDICATES NUMBER OF TIMES PLAYED

This application is a division of application Ser. No. 07/576,143, filed Aug. 29, 1990, now U.S. Pat. No. 5,050,031, issued Sep. 17, 1991, which is a continuation of U.S. application Ser. No. 07/160,022, filed Feb. 24, 1988; (now abandoned), which is a continuation-in-part of U.S. Ser. No. 07/117/813, filed Nov. 5, 1987 (now abandoned), which is a continuation-in-part of U.S. Ser. No. 07/009,340, filed Apr. 21, 1986, (now abandoned).

TECHNICAL FIELD

This invention relates to video record rental systems and methods, and to devices for ascertaining and indicating the number of times a recording has been played or used.

Rental of recorded matter is developing rapidly; the estimated retail turnover of video cassette rental already compares favorably with the gross proceeds from book publishing and record manufacturing. Commercial record rental is not widespread but this state of affairs may well alter in the light of increasing production of the so-called "compact discs". Like video cassettes, these are relatively expensive and rental may increasingly become an attractive alternative to outright purchase.

If an analogy can be drawn between a "blockbuster" film costing many millions of dollars to make and an author's manuscript, then a rented video cassette can be equated with such an article as a hardback edition of a book in a lending library or in a book exchange establishment. The studios and major distributors initially completely failed to see that, in allowing the sale or rental of these copies of the original film—purely as a sideline, they thought—they were shifting the very foundation of their enterprise. Unfortunately, this sideline is becoming the mainline, and the more quickly the screen production business recognizes the fact and restructures itself on a new foundation, the less damage it will suffer.

The studios and major distributors, then, clearly fell into the trap of perceiving video as a sideline or ancillary market. That mistake allowed them to acquiesce in the establishment of a system of video distribution that effectively cuts them off from control of the use of their own copyright material, denies them any direct participation in the exploitation of that copyright, permits blatant piracy of that copyright and seriously inhibits full exploitation of that copyright on behalf of the copyright owner.

It is a well-recognized fundamental rule of economic viability that it must be the end user who pays, but in the video cassette business the great problem is how is the end user to be made to pay? At present the "video revolution" is in what may aptly be termed its lending library phase, and an essential problem at the moment is that it is not ascertainable whether, or how often, a video tape has been played. It was basically this fact that aborted initial attempts to charge "per rental". There was no way of monitoring cassettes to ascertain whether a video tape had been run through once or a hundred times.

Screen production/distribution businesses normally sell tapes to video rental outlets for the highest price they are able to get. This is not in the interest of the sellers because the price must be kept low—uneconomically so—in order to discourage the all-too-prevalent pirate organizations and to keep down to a reasonable level the amount of capital required to stock a video rental business. On the other hand, this price is still relatively high from the point of view of the video shop owner and so discourages him from distributing as many copies of any particular tape as he would like to. Thus, in the long term, nobody benefits.

BACKGROUND ART

It is clearly desirable, then, that video cassettes should be provided with some kind of play-counting device. One proposal was the so-called "R-Cassette" developed in the U.S.A. in 1981. This enables a video cassette intended for rental to lock automatically after one viewing. The cassette can only be rewound by using a special device, supplied only to dealers which is linked up to a central computer that records each "use", thus enabling an exact calculation to be made of the number of times the video has been hired. This system would also enable payments to be made to copyright owners, calculated on a per rental basis. Among the factors that make this system unacceptable are:

1. It frustrates those renters who wish to view all or part of a program more than once.
2. It loads onto the dealer the time wasting task of rewinding every tape after rental.
3. It does not uniquely identify cassettes and so permits the continued depredations of pirates.
4. It requires dealers to invest in equipment that is otherwise irrelevant to the operation of his business.

The other system is known as the "Screen Key Card" system and operates by recording the material to be rented on cassette in a scrambled form. Customers are issued with a card containing a de-scrambling code which must be used in order to gain access to the video tape. This card also contains coded details of the subscriber's name, address, etc, thus enabling identification, invoicing and payment for each rental use. Each time the customer rents, the relevant de-scrambling code is programmed into the card and each time the de-scrambler is activated an electronic mark is made on the de-scrambled material. This system, however, requires the acquisition of special and complex hardware by every renter and appears to offer no auditing capability to the distributor.

Other proposals for counting and displaying the number of plays of a cassette have been proposed, but none has proven successful.

U.S. Pat. No. 3,995,319 discloses an audio tape cassette having a mechanical counter actuated by a geared arm in one corner of the cassette, the counter arm having a stop which stops the arm at an integral count so that the arm stands clear of the tape wound on the spool. This system has problems rendering it impractical. In particular the angle of the sensing arm in relation to the tape is likely to cause jamming, and uneven tension on the tape results from the fact that the arm, at times, stands clear of the tape and, at times, rubs against the tape. The space in the corner of a cassette is too restricted for location of an inexpensive and reliable counter mechanism. Furthermore, the movement of the tape reels inside the cassette when it is shaken would make such a device subject to false indexing.

U.S. Pat. No. 4,466,584 discloses video cassette having an escapement driven counter, actuated by a rocking member having two feeler arms in the free space between the spools, one riding on the tape wound on each spool. While this arrangement avoids the problem of the restricted space in the corner of a video cassette which prevents the use of the device disclosed in U.S. Pat. No. 3,995,319 on video tape cassettes, the escapement drive is complicated, and reliance on the wedging action between the tooth of the rocking member as it is radially driven into the toothed wheel to provide the wedging force to move the toothed wheel is unreliable. Furthermore, because the radius of the tape spools does not change linearly as the tape is played, at times, enough free space may be left between the arms and the spools to permit shaking of the cassette alone to falsely register a count (or to subtract a count). Also, the problem of uneven tension on the tape is still present since the arms are not continuously urged against the tape. Still further, the counting mechanism disclosed in U.S. Pat. No. 4,466,584 interferes with the spool brake, typically present in video tapes, because all space is taken up by the rocking member and escapement mechanism.

OBJECTS OF THE INVENTION

It is an object of the invention to provide a computerized video record rental system and method in which the foregoing disadvantage of prior proposed systems and methods are eliminated or greatly alleviated, and to provide an integral counting device in the record container which overcomes the similarity debilitating defects of prior counting devices.

More particularly, it is an object of the invention to provide a rental system and method in which video records, preferably in the form of video cassettes, can be consigned by the owners of retail outlets who then rent the cassettes to the public, with the confidence that the number of times each cassette is played will be recorded accurately, and that the owner will receive a share of the rental revenues with reasonable certainty and promptness, and with a minimum of extra labor and equipment costs. It is another object of the invention to allow the owner of artistic properties (e.g., motion pictures) recorded on the records to share in the revenues generated by the rentals in proportion to the popularity of the properties.

It also is an object of the invention to facilitate the distribution of such records in a manner such as to maximize the rental revenues for both the retailers and the owners by placing a sufficiently large inventory of the records in the retail outlets at the time when the property is the most popular, without requiring an inordinately large capital outlay by either the retailer or the owner.

It is a further object of the invention to provide such a system and method in which the rental revenues are collected and paid to the owners relatively promptly and with a minimum of human labor, and with a relatively modest outlay of equipment for use in the procedure.

A further object of the invention is to provide a device for accurately and reliably counting and recording the number of times the record has been played by the rental customer. It also is an object to provide such a device which does not require any modifications of the record player owned by the rental customer; a device which will operate with any known player and does not interfere with the operation of the player or require any extra effort on the part of the rental customer to use. It is a further object to provide such a device which overcomes or greatly alleviates the shortcomings of prior devices of the same type, and is of relatively simple and economical construction.

In particular, it is an object to provide such a device in video tape cassettes which is highly resistant to or immune to counting falsely in response to normally adverse conditions occurring during transportation and handling of the video cassette, both within and outside of the user's tape player.

SUMMARY OF THE INVENTION

The foregoing objects are met, in accordance with the present invention, by the provision of a computerized video record rental system and method in which a video record unit such as a tape cassette is provided with an integral counting device for counting the number of times the record is played. Upon rental of the record, the count is recorded in computer memory, together with an identification of the record unit. Upon returns of the unit to the rental outlet, the new count is entered in the computer memory, together with the record unit identification, and the computer computes the rental fee due based on the net play count for the record unit; that is, on the difference between the count upon rental and the count upon return.

Preferably, the computer performing the foregoing tasks is a small computer such as a "personal computer" located at the rental site. The equipment located at that site preferably includes a printer which prints customer receipts bearing the identification and count information at the times of rental and return of the record unit. Input of the identification code and count information preferably is by way of scanners or "wands" which read the information electrically. However, input by use of a keyboard also is possible.

It is also preferable that a central computer is provided at a location remote from the rental sites. The rental information is transmitted from the rental sites to the central computer periodically by way of modems and telephone lines, or by way of other data communication means. The central computer is similarly linked to computers located at the record owners' place of business.

It also is preferred that an electronic funds transfer network be provided to electronically transfer funds from accounts maintained by the retailers to the owners by way of the central computer. The amounts transferred from the retailers are equal to the rental receipts less the portion representing the retailers' shares. The amounts transferred by the central computer to the owners are equal to those received from the retailers less any share retained by the operator of the rental system.

The central computer provides reports to both the retailers and the owners. The reports to the retailers include accounts of the retailer's rentals, fees due, etc. The reports to the owners include total rentals of each specific artistic property, funds transferred, inventories, returns, etc.

The counting device of the present invention preferably is a mechanically activated device which senses the growth or reduction in size of a roll of video tape in a cassette. It senses the position of the outer surface of the roll at two opposite sides of the roll, and drives a counter in proportion to the changes in the distance between the two positions.

Preferably, those positions are sensed by followers which contact the roll and follow its movements. The followers advantageously take the form of caliper arms with a rotary counter mounted on one arm and drivably coupled to the other arm, with both arms being pivotably secured to the cassette housing at a single pivot point. Thus, the arms are free to swing about the pivot point to follow the movements of the loose tape roll as it moves laterally in the cassette during handling of the cassette outside of the record player. In addition, the caliper arms contact the tape roll at opposed points along the greatest dimension of the roll. These features virtually immunize the counter mechanism from making false counts due to the lateral shifting of the roll in the cassette.

Counting may be achieved mechanically, electromechanically, electronically etc., and in this latter regard the invention may consist in a video device including a capacitive sensor and a logic chip adapted to count crenellations on a tape reel periphery to thereby sense movement in a particular frequency band covering a range of speeds consistent with the play mode; a second sensor for energizing of the circuit; a timer chip pre-set to program duration of play and triggered by the logic chip, the timer chip being adapted to time substantially total play frequency duration to produce a threshold signal via the logic chip; total number of tape plays being recorded and/or displayed for a set rental period and progressive total number of tape plays being stored for subsequent information retrieval.

Preferably, the cassette identification information is marked on the cassette housing in machine-readable coded form, such as a bar code which can be read by a conventional bar-code reading wand at the retail site. It is preferred that the count also be machine-readable.

Another advantageous counting device of the present invention combines a mechanical counting mechanism with an integral electronic storage and read-out device. The mechanical count is converted to digital form and stored in a battery-energized memory element in the cassette housing. The stored count is converted to an electronically-detectable form and displayed or presented at the outside of the housing so as to be easily machine-readable. For example, the count can be displayed by means of a light-emitting diode array which can be read by a photo-detection type scanner or "wand" at the rental site, and then sent to the computer memory.

The invention meets the objectives set forth above and provides a system and method well suited to make it practical for movie and other artistic property owners to rent their properties and derive maximum revenue from them, while reducing capital outlays for the rental stores and materially increasing the availability of the artistic properties to the public.

The foregoing and other objects and advantages of the invention will be set forth in or apparent from the following description and drawings.

BRIEF DESCRIPTION OF THE DRAWINGS

In order that the reader may gain a better understanding of the present invention, certain preferred embodiments thereof will be hereinafter described by way of example only, and with reference to the accompanying drawings in which:

FIGS. 2 and 8 are rear end elevation and top plan views, respectively, of one of a preferred video cassette constructed in accordance with the invention adapted for use in the system depicted in FIG. 1, having a built-in mechanical counting device for recording the number of plays of the cassette and showing the numerals of the counting device through a viewing window; with FIG. 8 showing the cassette with the top wall of the casing removed;

DETAILED DESCRIPTION

Figure 1:
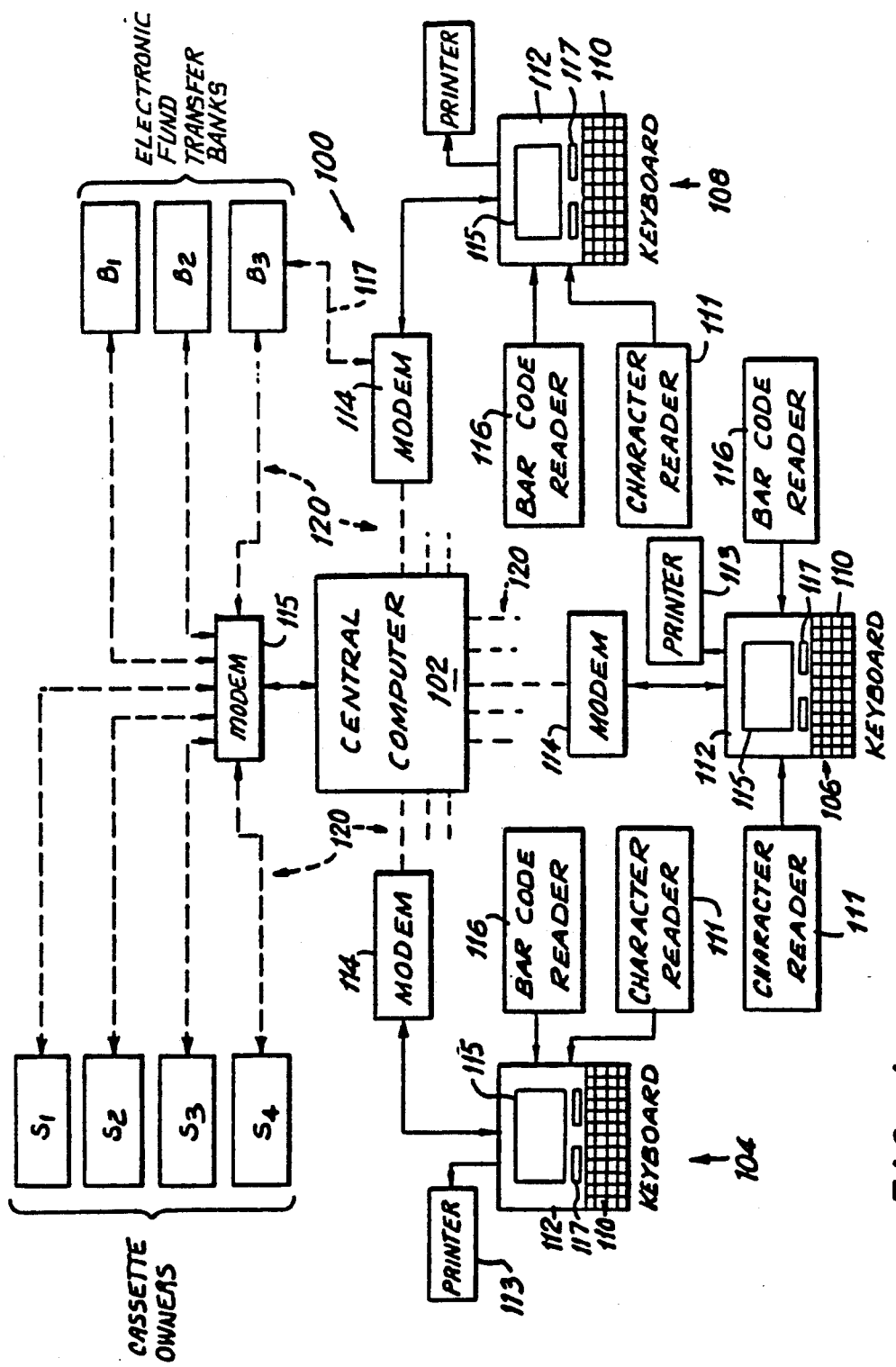
FIG. 1 is a schematic block diagram of a preferred embodiment of the computerized video record rental and accounting system of the present invention.

FIG. 1 of the drawings shows a computer system 100 for video cassette rental and accounting control. The system includes a central computer 102 and a plurality of remote "point-of-sale" terminals 104, 106 and 108, which are merely three examples of the much larger number of terminals typically comprising the system.

Each terminal 104, 106, 108, etc., includes a keyboard 110 and a microcomputer 112 such as any of a number of commercially available personal computers ("PC's"). Each terminal also includes a printer 113, a bar code reading device 116, and a modem 114. The terminal is located at a retail rental store, for example, and is coupled to the central computer 102 through the modems 114 and telephone lines 120.

Each of the computers 112 in the retail store terminals 104, 106, etc., preferably has a CRT display screen 115 and hard disk and soft disk drives for program and other storage tasks, as well as RAM and other electronic memory, as is customary with most conventional PC's.

Stored in each computer 112 is an operating program and an application program. The application program consists of a conventional module such as the "Master Video" module sold by Bonifide Management Systems, Inc. of Reseda, Calif., which is used in many video cassette sales and rental stores for various accounting functions specific to such businesses, together with modifications necessary to perform the new tasks to be set forth below. Since those modifications are well within the skill of the art to make, the specific steps used in the modifications will not be described in detail herein.

Figure 2:
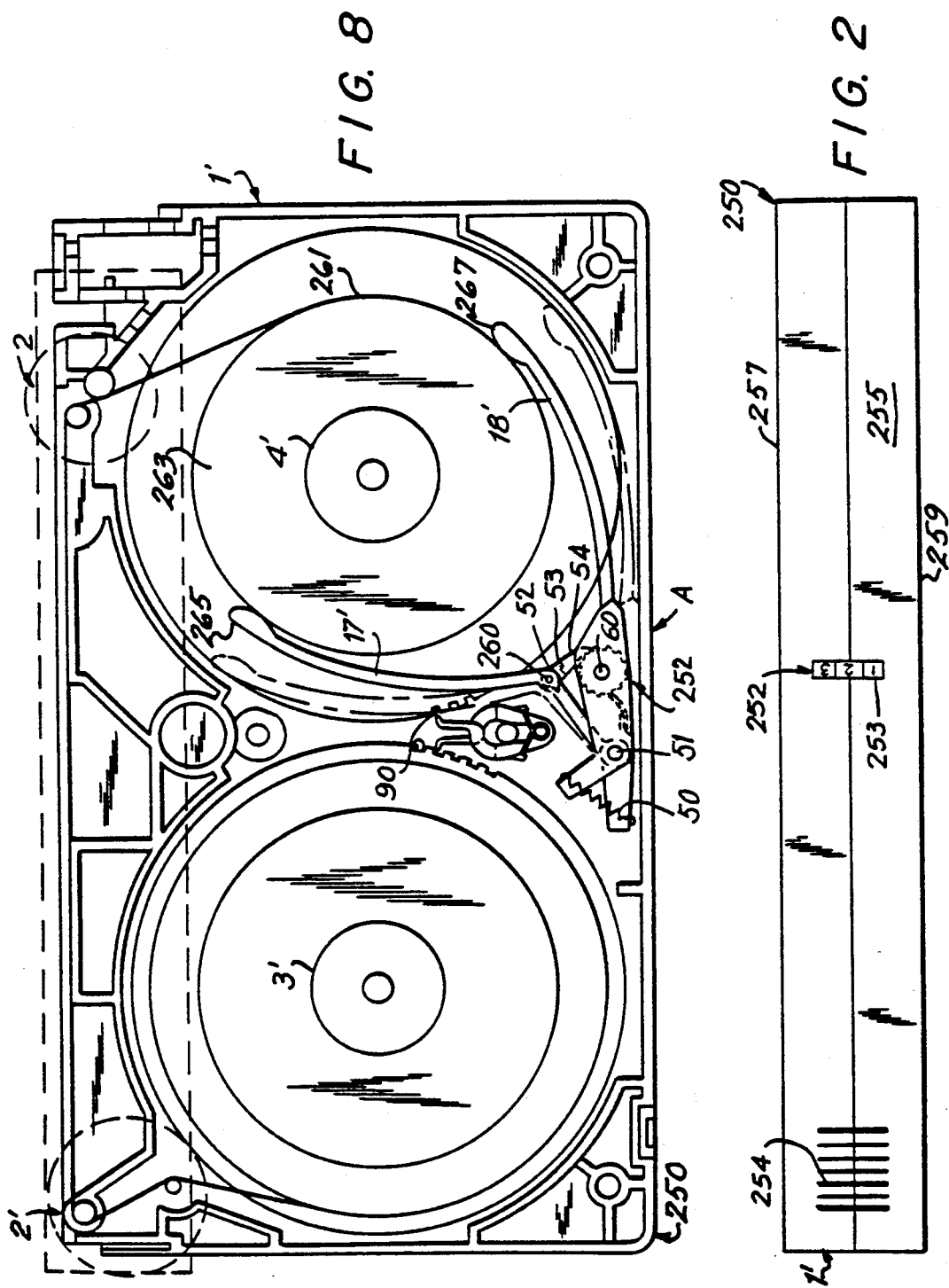

As it is shown in FIG. 2, each tape cassette 250 includes a play counter 252 which provides a count of the total number of plays of the cassette, which is preferably visible through a window 253 at the back edge 255 of the cassette.

Also on the back edge of the cassette is a bar code 254 which uniquely identifies the cassette, i.e. the copyright owner, title, copy number etc. Typically, a 12-digit code is used.

In accordance with the method of the invention, the rental of video cassettes is accomplished as follows. Preferably, the video cassettes are owned by a business entity which records the cassettes or is a cassette distributor. That entity merely consigns or loans the cassettes to the retailers. For example, the business entity is a motion picture studio or distributor which owns the artistic property recorded on the cassettes.

When a cassette is rented at a retail rental store, the rental clerk reads the bar code 254 on the cassette into the central computer 102 through the modem 114 by means of the bar code reader 116. Preferably, however, the bar code is read into the rental computer 112 in the retail store. The reader 116 is of conventional construction and is one of the types typically used in point-of-sale terminal systems. If no bar code reader is available, or if the bar code reader malfunctions, the identifying information can be entered by means of the keyboard 110. For this purpose, the information represented by the bar code also is printed on the cassette in alphanumeric characters readable by humans.

Figure 16:
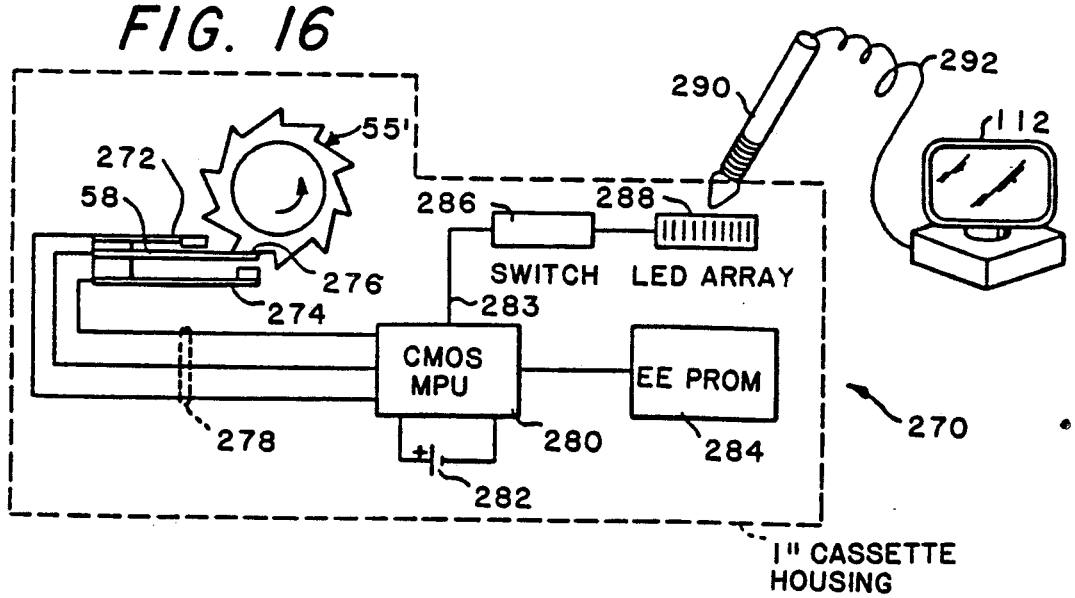
FIG. 16 is a schematic circuit diagram of another embodiment of the play-counting cassette and system of the invention.

The clerk also inputs to the computer 102 or 112 the play count from the counter 252 by means of the keyboard 110. Alternatively, the count may be read by a character reader 111, or by the bar code reader itself, if the system shown in FIG. 16 is used.

Preferably, each customer is given an identification number. If the customer is a member of a "rental club", he or she already has such a number. If not, a number is assigned, principally in order to establish a credit and trustworthiness history for customers, in order to minimize cassette and rental revenue losses.

A printed record of the transaction, including its date, the initial payment received from the customer, the rental rate per play, late charge rate, and the cassette identification and play count, is prepared on the printer 113 of the terminal and given to the rental customer. This data is stored in the memory of the rental computer 112.

When the cassette is returned, the clerk again reads the cassette identification code 254 into the computer 102 or 112, and inputs the new play count, together with the amount of any rental or late fees or other fees received from the customer at that time.

In the embodiment in which the central computer stores the data, the computer 102 uses the bar code to uniquely identify each cassette, and stores the beginning and ending play counts, computes the net play count, the rental fee and the difference between the two counts, and computes the share of the fee to be received by the owner of the cassette. At the end of each pre-set business time period, e.g. each week, the computer 102 prepares an invoice and sends it to the retailer through the telephone lines and modems, to be printed out on the printer of each terminal.

Thus, the system 100 provides for the accounting and reporting of every rental and invoicing for rental fees without separate telephone calls, messengers or mailings, thus making the rental system cost-effective.

The system 100 further provides for the collation of returns relating to each title from multiple outlets and for the transmission of those returns to the copyright owner.

In the preferred embodiment of the system 100, in which the rental computer 112 at each terminal 104, 106, 108, etc., stores the data for the individual rental transactions, the computer 112 is programmed, using the above-mentioned "Master Video" software module, with modifications, so as to operate as described above on rental of a cassette, and as described below on return of the cassette.

When the customer returns the cassette, the rental clerk inputs to the computer 112 the cassette identification data, either by way of the bar code reader 116, or by use of the keyboard 110, and retrieves from memory the information previously stored for the rental transaction. Preferably, this information is displayed on the video display screen 155 of the computer. The rental clerk also inputs the new count on the cassette counter, either by use of the keyboard 110, or by use of the character reader 111.

The computer 112 stores for the cassette the rental rate per play, the charge rate for late returns by the customer, and any other applicable charge rates. The computer subtracts the beginning cassette count from the return count, thus computing the net play count, and multiplies this times the applicable rate to determine the total rental fee.

Normally, the customer pays a certain minimum rental fee upon initially renting the tape. For example, the customer pays at least for a one day rental and one play of the tape. Thus, if the tape has been played more than once upon return, the computer notes this and subtract the initial payment made by the customer from the total fee due and computes a balance to be received from the customer at that time. When the customer pays the additional money, this is entered in the computer by the clerk, and the computer updates the total received in the transaction and indicates its completion.

If desired, the modem 114 can be of the type which is continuously enabled, and it immediately transmits to the central computer the results of the transaction. However, in most stores it is preferable that the modem 114 be of the "dial-up" type which is connected to the telephone line only when a number or sequence of numbers is dialed on a telephone dial.

In any event, periodically, such as at the end of each day, or week, the rental retailer transmits the total rental information stored in the computer 112 during the period in question.

The central computer 102 is programmed to receive and store the data from each rental computer 115. Then it periodically sorts the rental information received from many retail rental outlets and prepares various reports. Basically, the reports will summarize the number of rentals and the number of plays of each artistic property rented by each retail outlet, together with rental receipts for each property, as well as returns of cassettes to the owners, etc.

The central computer 102 also will sort the data and prepare total rentals and plays and receipts for the period from all rental outlets included within the system. Then the central computer 102 periodically transmits the reports through a modem 115 to terminals S1, S2, S3, S4, etc., located on the business premises of the cassette owners. Preferably, each terminal at the cassette owners' premises also includes a computer for storing the information received and printing out the reports transmitted.

Payments preferably are made to the owners of the cassettes and the operator of the system 100 as follows; each rental outlet maintains funds in an account at one of several banks B1, B2, B3, which has electronic funds transfer capabilities.

Whenever the central computer 102 receives from one of the rental computers 112 a periodic report of revenues, the computer 102 prepares and sends to the retailer an audit report confirming the information transmitted, together with any other financial information desired, and requesting confirmation of the correctness of the audit report. The audit report will include a percentage of the rental receipts which must be paid to the owners of the cassettes and the operators of the system 100. For example, if the retail outlet reported $1000 in rental revenues for a given period, and the retailer's share of those revenues is 20%, the central computer would indicate that the remainder, $800 was to be transmitted by the retailer.

Of course, the programming of the central computer 102 enables the system operator to poll any rental computers in which rental reports are delinquent, or for other purposes.

When the audit report is approved by the retailer, a signal is sent to one of the electronic fund transfer banks, B1, B2, B3, etc., in which the retailer has deposited adequate funds or has an adequate line of credit, and the funds are electronically transferred from the bank through the modem 115 to the central computer 102. The central computer then computes the share to be retained for the operator of the system 100, deducts that, and electronically transmits through the modem 115 to the cassette owners their share of the rental receipts.

If desired, a data link 117 can be provided directly between the retailer's terminal and his electronic fund transfer bank so that he can communicate his approval or disapproval of the request for funds from the central computer, or so that he can enable payment pursuant to the retailer's line of credit with the bank.

The electronic fund transfer aspect of the system and method of the present invention is highly advantageous in that it avoids the delay caused by writing checks, it avoids the labor of such tasks, and avoids other labor and handling costs. Of course, payment can be made by mail or other conventional means, if preferred.

The rental system and method have further advantages in that, since the retailer need not make the significant investment required in purchasing large numbers of cassettes, he can stock larger numbers of the more popular cassettes and minimize the number of times he runs out of stock in the cassettes, thereby increasing the number of rentals of the program recorded on the cassette. This brings greater revenues to the producers of the most popular programs than from prior arrangements, in which they merely sold the cassettes to retailers who then kept all of the rental income.

The system 100 also makes it economically viable for the retailer to stock a wide variety of special interest programs that would not normally be kept in stock and return to the owners of those programs revenue that would otherwise not have been earned at all.

The rental system and method brings these benefits to the program owner without inordinately increasing the cassette production costs because the incremental costs of producing the necessary extra cassettes are relatively low.

In total, the system and method of the invention benefit all parties; the producer of the cassette, the retailer and the public, which enjoys the greater availability of its favorite programs.

REFINEMENTS

Some video store software modules such as the "Master Video" module used in the preferred embodiment of the present invention, make the printing of receipts to customers optional. For the purposes of the present invention, the software is modified so as to flag each cassette rental transaction, and mandate the preparation of a printed receipt each time a customer transaction includes such a rental. It is considered to be a substantial advantage to inevitably offer the customer a receipt at the time of a rental transaction so that he or she will have a printed record of the rental rates, etc., and will not become disgruntled upon being billed for per play charges and late charges when the cassette is returned.

Preferably, a "prompt" is added to the software which causes an inquiry to be displayed on the computer screen 115 seeking the count number from the rental cassette. The software also is modified to enable the operator to override the computer requirement for a count number. This is to allow for the correction of errors, such as where the starting count was misread by the rental clerk, or where the customer contends that the count must be inaccurate and the retailer decides to accept the customers contention. If the prompt is overridden, the clerk cannot proceed with the transaction until the count number is entered.

Whenever the override function is enabled, an exception report is generated and ultimately must be reconciled.

For each artistic property (program), the basic Master Video software is modified to add the following fields;
Revenue per play;
Revenue per day (rental charges for each day, regardless of the number of plays);
Late charges per day;
Share of per day charges owed to system operator;
Gross owed to system operator for late charges;
Total income for all plays;
Total income for all daily rentals;
Total income from late charges;
System operator charges from per play charges;
System operator income from daily rate charges;
System operator income from late charges;
The last reading on the counter for that cassette;
Location code and indication of format used at that location (VHS or BETA);
Quantity of that title on reserve at the retail location.

The "Master Video" module provides a customer report for each customer showing at least the last ten rentals by the customer where abnormal activity occurred; e.g., late returns, unpaid counts, etc. This report should enable the store to restrict rentals or to take the appropriate steps to insure better customer collections.

Whenever a rental cassette is returned with more than the basic one day/one play charge due (which has already been paid for by the customer), the operator automatically will be presented with a customer screen on the display 115 which indicates to the customer and the clerk that additional charges must be paid by the customer If the cassette has been returned by way of a night deposit box, or by means other than in person, a notice of the extra charge is stored in the customer's file, which will be retrieved from memory and presented, either when the customer next visits the store, or when the computer files are reviewed for the purpose of preparing bills to be mailed to the customers.

The software modification enables the rental clerk to override the requirement for the additional charges, such as where the retail establishment decides to forego such charges due to the fact that the customer is a good customer, or has a justifiable complaint, etc. Of course, an exception report is prepared in response to the override.

The video store software module includes instructions for printing receipts for any returns involving late charges. The software is modified to include per play charges on such a receipt.

Rental rates for long term periods also can be used in the system. For example, weekly rates can be stored and retrieved.

Upon request, the rental computer 112 prepares an in-house audit report in order to enable the retail outlet operator to compute the amount that he must pay to the system operator. The report figures should match those transmitted from the central computer 102 to the computer 112 and which was described above.

It should be noted that both the cassette owner and the system operator share in the extra revenue generated by the customer either retaining the cassette for more than one day, or for extra plays above the one play initially charged for upon rental of the cassette. Thus, the cassette owners share in these additional charges as well as in the basic rental fees.

It is preferred that there be two different identification codes for each cassette; one being the unique 12 digit number described above, and the other being a different code assigned to that particular cassette by the store owner to facilitate storing and retrieving the cassette.

In accordance with another advantageous aspect of the present invention, although cassettes usually are sent to each particular retail outlet directly from the cassette owner, it also is possible for a rental outlet to receive cassettes from another rental outlet. Transfer from one outlet to another can be accomplished in order to transfer overstock from one rental site to correct an under-stocking problem at another site.

Whenever the owner sends cassettes to any rental outlet, his computer sends to the central computer 102 information indicating the number of each title sent, the cassette identification numbers and similar data. The owners computer will print a packing slip to be shipped with the shipment to the retail outlet.

The system software at the retailer's rental computer enables him to enter data regarding stock received and to print out a report that can be matched against the packing slip.

When cassettes are transferred from one store to another, a similar packing slip is prepared by the sending store, and information is transmitted to the central computer 102 just as if the goods were being shipped from the owner to the receiving store. Thereafter, the receiving store can prepare a received stock report and compare it against the packing slip.

Each rental outlet is required to return the cassettes it receives to the cassette owner when the rental life of the cassette is over. For this purpose, the rental computer 112 is used to prepare a return report which is transmitted to the central computer 102 and the cassette owner, and the retail rental outlet ships the cassettes back to the owner.

The cassette owner then can reuse each cassette until it is worn out. He can record a new program on the video tape in the cassette, and he can reset the mechanical counter in the cassette to zero, if he desires.

The central computer 102 is programmed to keep track of the total rentals of each title or artistic property by each store. When it detects the fact that a particular store has reported rentals which are well below expected norms, then an auditor will be sent to the store to determine whether the store is accurately recording all rentals. Since each cassette has an internal mechanical counter which cannot be disabled without opening the cassette, and because each cassette preferably is made relatively tamper-proof to make it difficult to disable or interfere with the normal operation of the counter, the counters provide reliable means for checking on the reporting accuracy of various retail outlets. As noted above, various exception reports are provided automatically by the software. Another exception report is provided whenever there is an abnormal jump in the recorded count. In most cases, such jumps will merely be the result of a misreading of the counter. This can be corrected and reconciled eventually.

The basic software, unmodified, provides for making reservations on a first in/first served basis by title. Similarly, the software provides a put-away report which flags returned cassettes to indicate that they are now available for rental. The software is modified so that all rental cassettes rented pursuant to the present invention will be flagged and each unique cassette identification number will be indicated together with the last cassette counter reading.

Defaulting customers should be flagged as delinquents. Delinquent customer files should remain in memory. Thereafter, the software routine should automatically search its records for the name of any new customer to make certain that that name is not located in the delinquent file. This prevents customers from taking out new memberships when they are already delinquent. Alternatively, a customer name list can be displayed so that the existence of a file on that customer can be determined visually by the clerk.

Preferably, any transaction such as overrides, etc., which is contrary to normal store policy should be highlighted on the screen of the computer 112.

COUNTING CASSETTES

Figure 3:
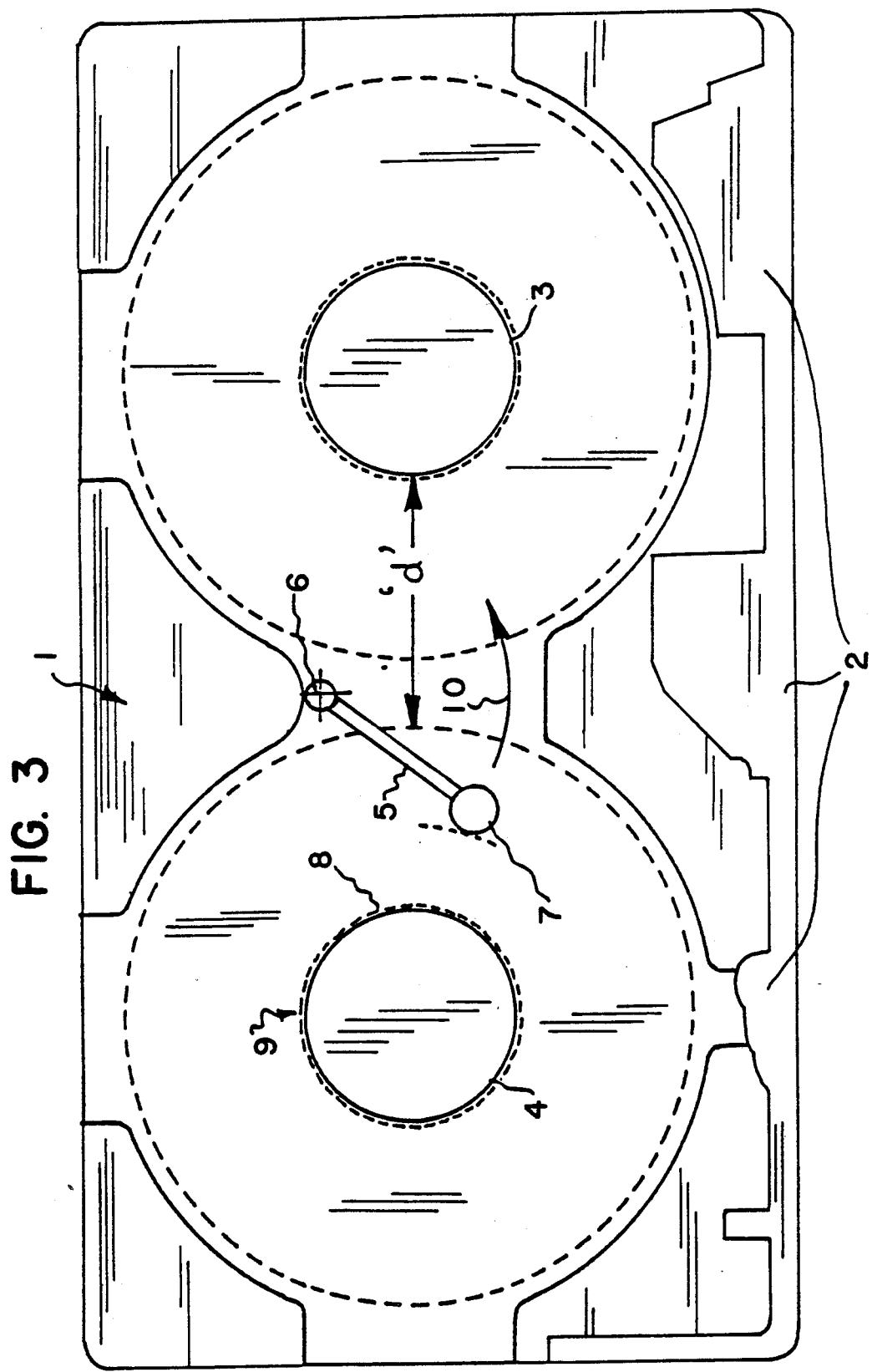
FIG. 3 is a top plan view of another video cassette constructed in accordance with the invention, shown with the top cover removed.

Referring now to FIG. 3, a video cassette incorporating a built-in mechanical counter, well adapted for use in the foregoing system, is illustrated. The video cassette includes a casing generally referenced 1. The cassette has a magnetic-tape guidance assembly 2, a delivery reel hub 3 and a take-up reel hub 4. When a tape is played, the diameter of the reel centered on take-up hub 4 increases while that on delivery hub 3 simultaneously decreases. When the tape has been fully played, it is rewound back onto delivery hub 3. It might be noted that the distance "d", that is to say, between the two reeled portions of tape at any point of play, is not constant. At "half-way play" position this distance is very slightly less than it is at "full-play" or "start-of-play" positions. Moreover, the distance "d" varies slightly between the "Beta" and "VHS" systems and therefore the inventive counting device is adapted to be able to be employed in both kinds of video cassettes by selecting the minimum average distance for "d" in respect of both systems.

The mechanical counting device of this embodiment includes an arm 5 pivoted within casing 1 at a point 6 equidistant between hubs 3 and 4. Pivoted arm 5 terminates in a camming head 7 and may be spring-urged to maintain it in constant contact with the surface of the outer turn of tape on hub 4, this contact being initially at the point 8 on broken circle 9 which represents the minimum tape diameter on hub 4. To reduce frictional wear on the tape, camming head 7 may include a wheel.

After commencement of play, the diameter of the tape portion on take-up reel hub 4 increases and moves arm 5 through an arc indicated by the curved arrow 10. When a predetermined number of degrees of arc has been traversed by pivoted arm 5, this latter activates a trip means of a counting mechanism to thereby indicate that the tape has been played, or substantially played, on time. Ideally, this count is initiated when, say, from about 50% to about 90% of the tape has run through. On the rewinding of the tape back onto delivery hub 3, a ratchet-and-pawl assembly may ensure that the "rewind" is not counted as being a "play". Alternatively, the trip means may be activated to count both winds and re-winds, the pair of counts therefore representing one play of the tape. In other words the counting device will thus record the number of times that a consumer has benefited by the playing of the video tape cassette.

Figure 4:
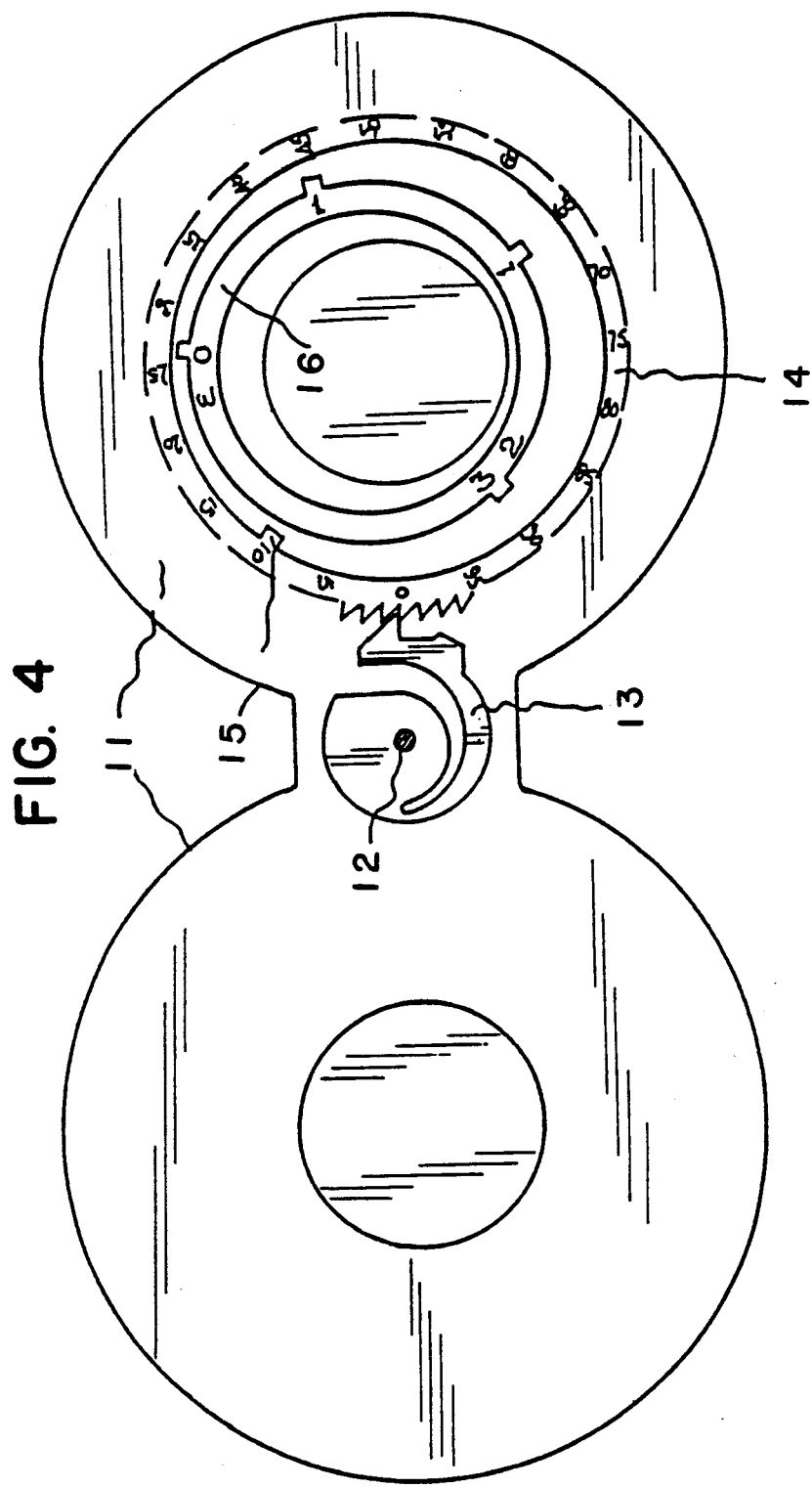
FIG. 4 is a schematic plan view of another video cassette constructed in accordance with the invention, with the cassette case removed.

FIG. 4 shows shows a suitable counting mechanism which includes a planar cover plate 11 adapted to be accommodated within a video cassette casing, as that generally referenced 1 in FIG. 3. In this embodiment the arm is pivoted at point 12 coaxial with a counter-actuating pawl member 13 which is arranged so as to rotate as the arm moves through its arc in response to change in reel diameter. When a predetermined number of degrees of arc has been transversed, the tip of pawl member 13 contacts a tooth of a peripherally-toothed counter ring 14 and counts one play. When a hundred plays have been counted, a lug 15 on the inner periphery of ring 14 meshes with a co-acting lug on the periphery of a hundred-plays counter ring 16 which may be adapted to count up to, say, 399 plays. On the rewinding of the tape back onto the delivery hub, this ratchet-and-pawl arrangement ensures that the "rewind" is not counted as being a play.

Figure 5:
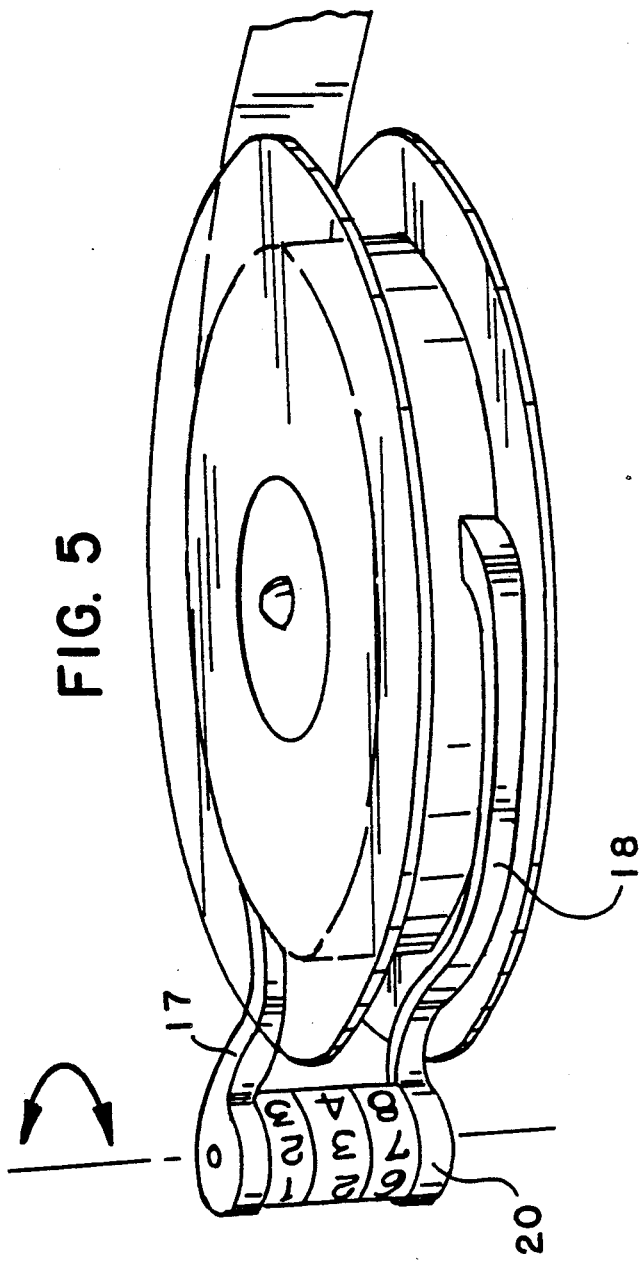
FIG. 5 is a perspective view, partially schematic, of a portion of another cassette embodying some of the basic principles of the embodiment of FIGS. 2 and 8.

In the further embodiment shown in FIG. 5, the device includes a pair of pivoted arms 17, 18 which operate to measure the diameter of the reel of tape, a drum counter 19 moves accordingly on its axis of rotation 20 to count plays.

Figure 6:
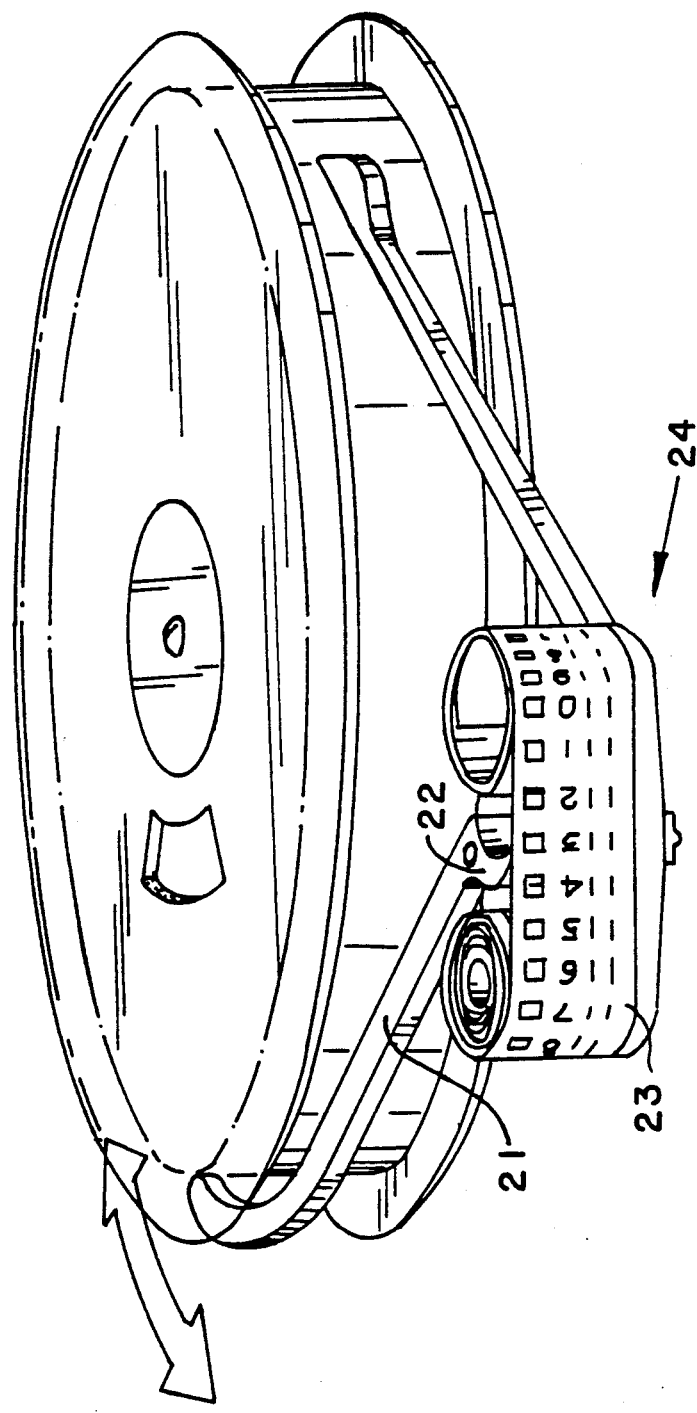
FIG. 6 is a perspective view, partially schematic, of a portion of another cassette constructed in accordance with the invention.

Yet a further mechanical embodiment is to be seen in FIG. 6; here, a pivoted arm 21 senses the change in diameter of the reel. Arm 21 is provided with a finger 22 adapted to engage with a tape 23 of a tape-counter device 24.

Figure 7:
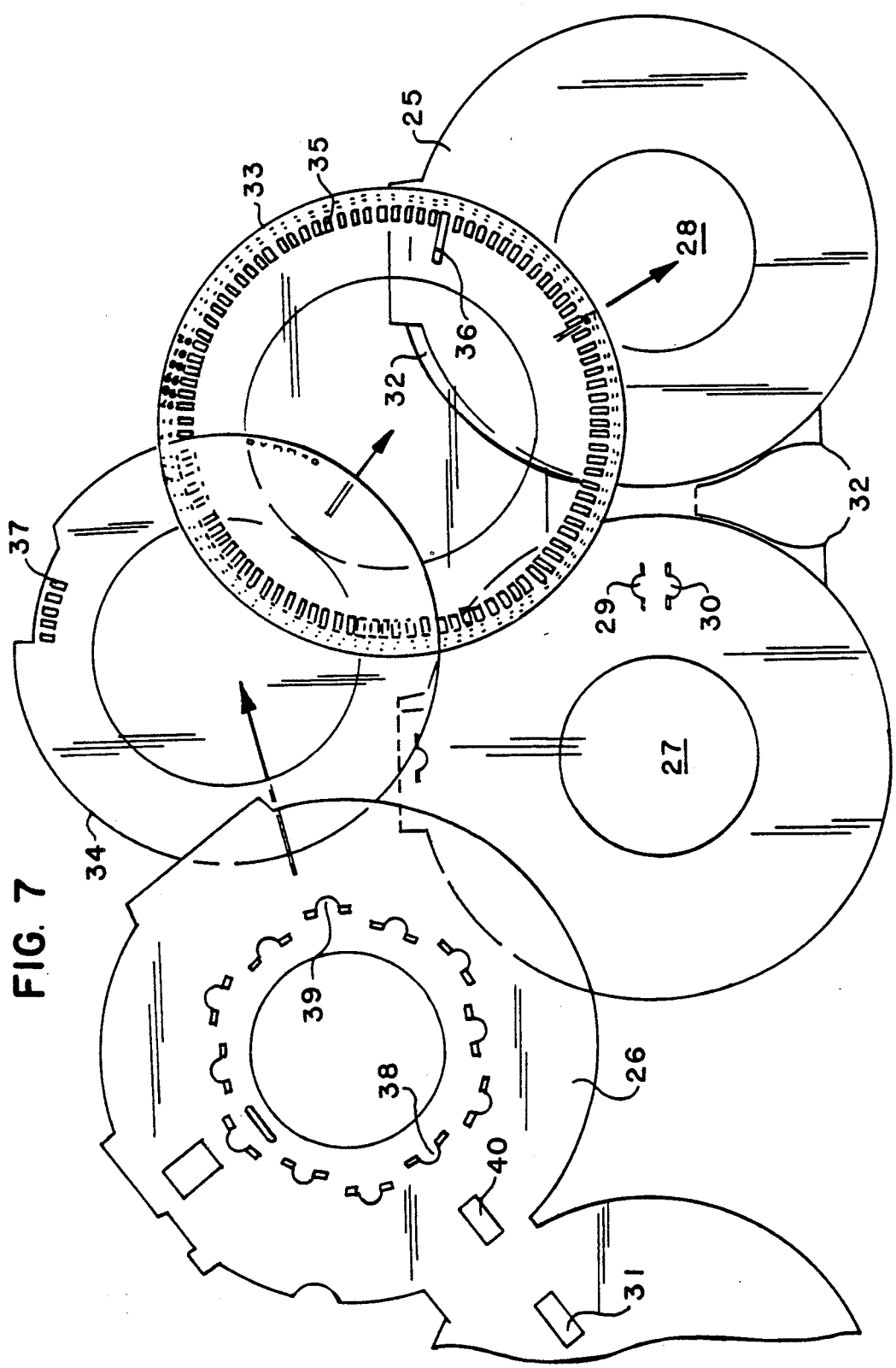
FIG. 7 is an exploded view of another embodiment of the counting means of a video cassette constructed in accordance with the invention.

In another embodiment there is provided an actuator assembly of the type illustrated in exploded view in FIG. 7. The actuator assembly is adapted to be housed within the video cassette casing between the delivery/take-up reels and the bottom face of the cassette casing.

The actuator assembly/counter assembly comprises a top cover plate 25 slidably engaged to a stationary or fixed bottom cover plate 26. The top cover plate 25 comprises two eccentric or elliptical openings 27 and 28 to allow for movement of the top cover plate relative to the hubs of the delivery and take up reels. Tongue members 29 and 30 on the top cover plate are adapted to engage the elongate slot 31 in the bottom cover plate and help facilitate the top cover plate's slidable engagement with the bottom cover plate.

On the upper face (not shown) of the top cover plate 25 is arranged a frame 32 comprising two arcuate members spaced from the outer periphery of magnetic tape on the delivery and take up reels, said arcuate members being rigidly connected via a bridging member axially aligned with a notional line running through the axial centers of the two reel hubs. The arcuate members are affixed to tab extensions on the top cover plate. The arcuate members contain spring plate members adapted to contact the outer periphery of tape on either the delivery reel or the take up reel. The whole top cover plate assembly or carriage is thus adapted for movement as magnetic tape is transferred from one reel to the other.

The counter assembly comprises a units counting wheel 33 and a hundreds counting wheel 34, both with indicia indicated adjacent the outer peripheral edge. The units counting wheel comprises 100 slots 35 spaced 3.6° apart, each slot except one being 3.0 mm×1 mm, with the remaining slot 36 being 8.0 mm×1 mm; this latter slot allows for engagement of the hundreds counting wheel when the units counting wheel has passed through one rotation. The hundreds counting wheel is provided with a series of five slots 37 spaced 4° apart.

A series of six spaced tabs 38 about an inner periphery of the bottom cover plate provide a bearing or hub for the units counting wheel, and a further series of six tabs 39 spaced outwardly therefrom provide a bearing or hub for the hundreds counting wheel. The indicia on the counting wheel(s), corresponding to the number of plays of the video cassette are readable through window 40, which has a corresponding window opening in the bottom face of the video cassette casing.

The slots 35 to 37 of the counting wheels are engaged by tongue means (not shown) depressed and depending from the lower surface of the top cover plate 25. The combination of these slots and the tongue means provides a ratchet-and-pawl arrangement for rotation of the counting wheels according to the number of plays. On the rewinding of the tape back onto the delivery hub, this ratchet-and-pawl arrangement ensures that the "rewind" is not counted as being a play.

All components can be manufactured from plastics material. In this embodiment, the top and bottom cover plates, and the counting wheels, can all be fabricated from 0.08 polyester.

PREFERRED EMBODIMENT

FIGS. 2, 8, 9, and 10 show a preferred video cassette having caliper arms of the general type depicted in FIG. 5 for sensing the change in diameter of the tape wound on the spool or reel.

Referring first to FIG. 2, the video cassette includes a casing with a top wall 257, bottom wall 259, and a rear wall 255. As it is shown in FIG. 8, the cassette has a magnetic tape guidance assembly 2', a delivery reel hub 3' and a take-up reel hub 4'. When a tape is played, the diameter of the tape roll 263 wound onto the take-up hub 4' increases while that on delivery hub 3' simultaneously decreases.

Now referring to FIG. 8, in this preferred form, the counting device of the invention includes a pair of caliper arms, 17' and 18', which sense the changing diameter of the tape roll 263 on the take-up reel. Caliper arms 17' and 18' are spring-loaded inwardly against the outer surface 261 of the take-up roll by means of a spring 50.

Figure 12:
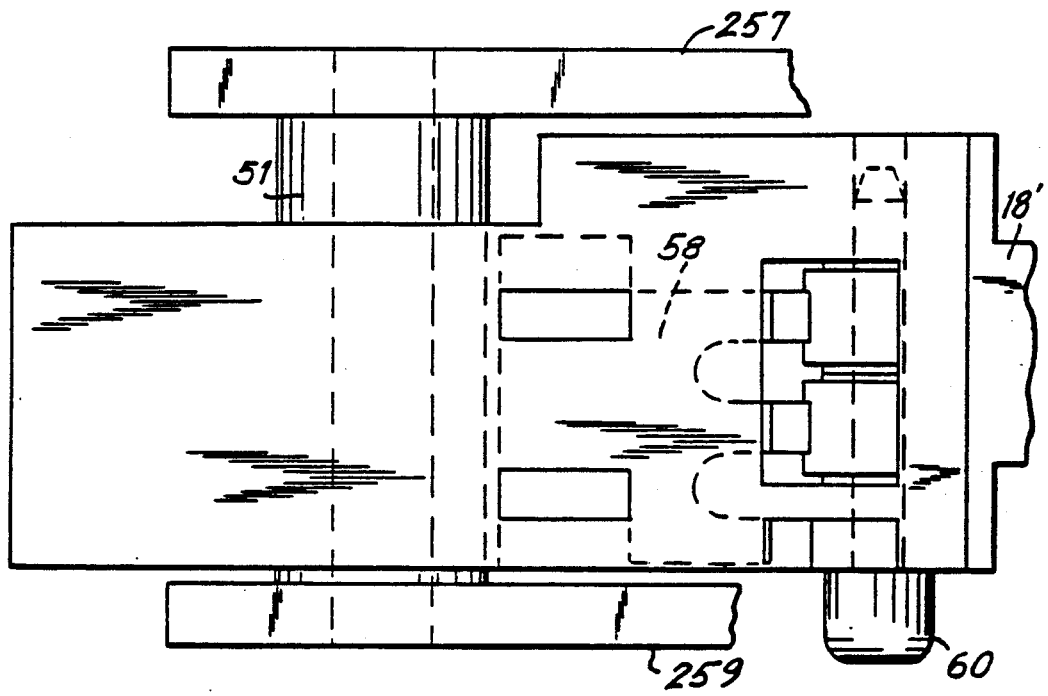
FIG. 12 is an enlarged view, taken in a direction opposite to the direction "A" of the numeral wheel portion of the mechanical counting device depicted in FIGS. 8 and 11.

The caliper arms 17' and 18' are pivotably mounted on a shaft 51 which as shown in FIG. 12, is secured to the top wall 257 and bottom wall 259 of the casing 1'. As it is shown in FIG. 8, the shaft 51 is located between the left ends of the caliper arms and the right ends 265 and 267 of those arms, which contact the outer surface 261 of the take-up tape roll 263. Thus, the spring 50 holds the caliper arms in contact with the tape roll 263 at all times, both when the tape roll is revolving as the tape is being played or rewound in a tape player, and also when the tape roll shifts laterally during movement of the cassette in transit.

As the caliper arms 17' and 18' are forced apart by the increasing diameter of the tape roll on the take-up reel, the counter 252 is driven so as to increase the count by one when the diameter of the tape roll 263 reaches a pre-determined value. This value typically is a fraction of the maximum diameter of the tape roll 263. Usually, this fraction is greater than one half, but substantially less than maximum diameter, so that one play will be counted when a major fraction of a full length tape has been played.

Figure 9:
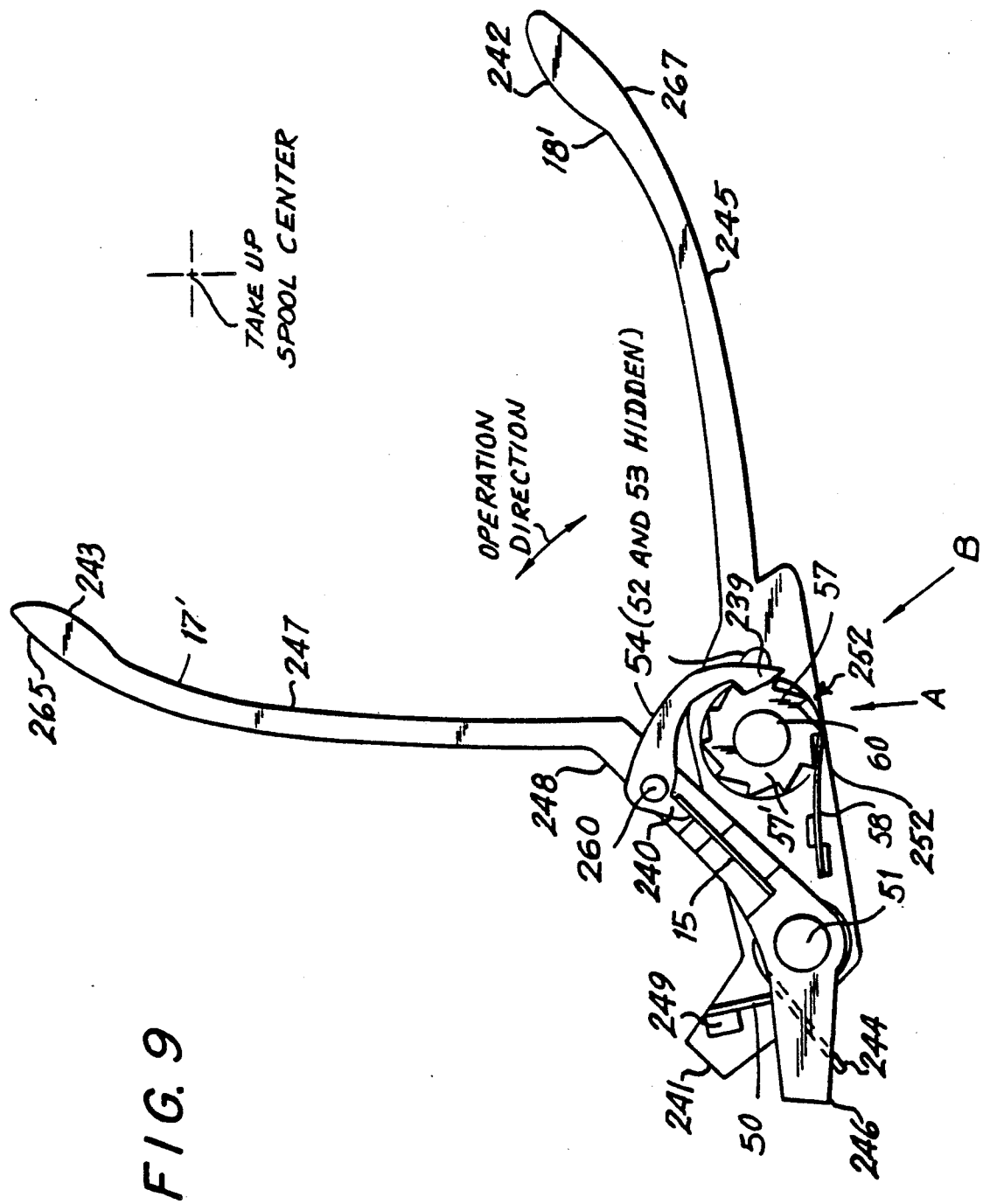
FIG. 9 is an enlarged plan view of a mechanical counting device very nearly the same as that of the video cassette depicted in FIGS. 2 and 8.

The tape roll diameter-sensing mechanism shown in FIG. 9 is the same in function and operation as that shown in FIG. 8, but differs in some details. The operation of both mechanisms now will be described by reference solely to FIGS. 9 and 10 through 12.

The caliper arm 17' has a right end 265 with a convexly curved bearing area 243 to ride on the surface of the tape roll with minimum friction and wear, and a section 247 which is curved so as to ensure clearance between the tape roll and the arm at all points other than the bearing area 243 when the roll 263 is at its largest size. The caliper arm 18' has a similar bearing area 243 and curved portion 245.

The arm 17' has a mid section 248 and a left end section 246. The arm 18' has a relatively wide mid section 242 and a left end section 241.

The spring 50 is a torsion spring wrapped around the shaft 51 and is anchored at one end to a block 249 attached to the left end 241 of the arm 18', and at the other end 244 to the left end 246 of the arm 17'.

Figure 10:
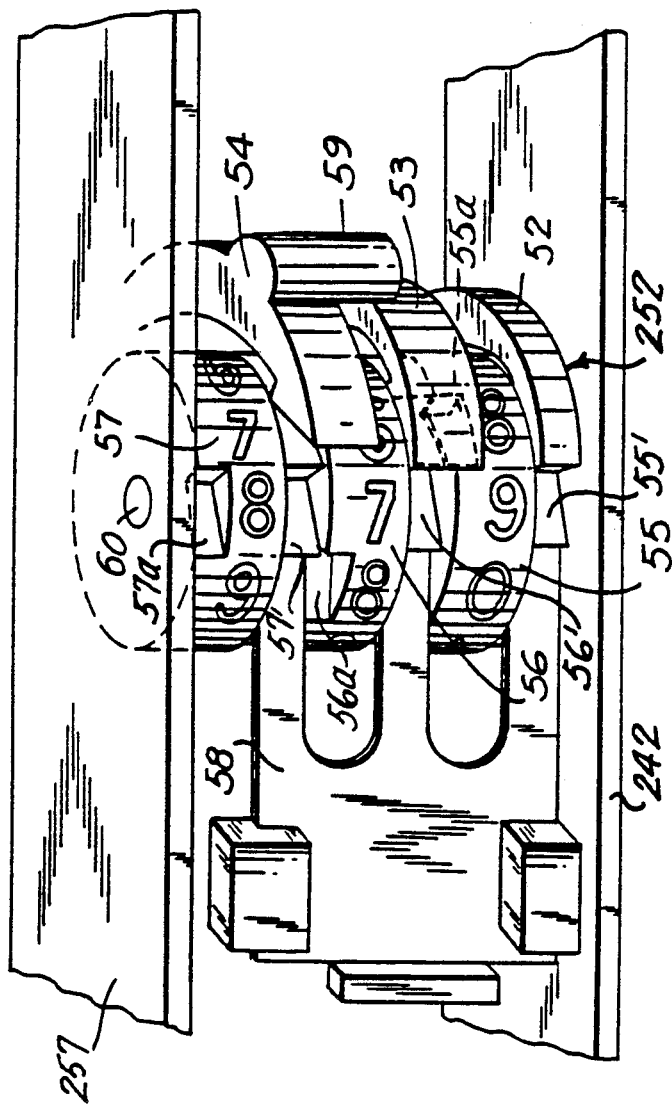
FIG. 10 is an enlarged perspective view of the numeral wheel and actuating arm portion of the mechanical counting device depicted in FIGS. 8 and 9.
Figure 11:
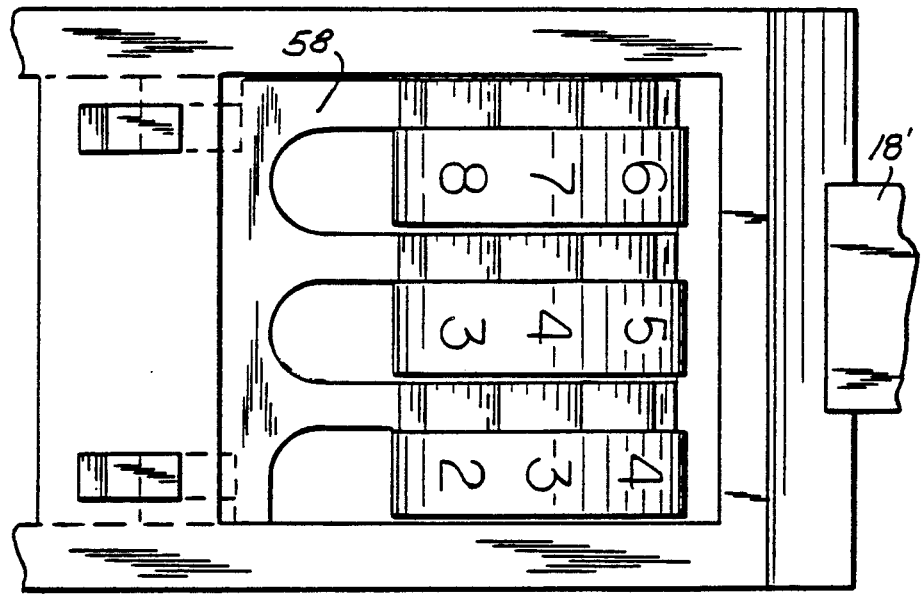
FIG. 11 is an enlarged elevation view, taken in the direction "A", of the numeral wheel portion of the mechanical counting device depicted in FIG. 8.

As it is shown in FIG. 10, the counter 252 consists of three counting wheels 55, 56 and 57 with integral ratchet wheels 55', 56', and 57' rotatably mounted on a shaft 60 which is secured at its lower end to the mid section 242 of the caliper arm 18'. FIG. 9 shows the counter 252 with the top wheel 57 removed so that the toothed ratchet wheel 57' is exposed to view.

As it is shown in FIG. 9, a shaft 260 is secured at one end to the mid section 248 of the caliper arm 17'. Rotatably mounted on the shaft 260 are three actuating arms 52, 53 and 54. Only arm 54 is visible in FIG. 9, but all three arms are visible in FIG. 10.

Each of the arms 52-54 has a left end projection 240 (FIG. 9) and a toothed right end 239. A leaf spring 15 is secured at its left end to the mid-section 248 of the caliper arm 17'. The right end of the spring 15 bears against the projections 240 and urges each of the arms to rotate clockwise about the shaft 260 and thus urges the toothed end 239 of each actuation arm against its corresponding ratchet wheel.

Referring to both FIGS. 9 and 10, a three-pronged leaf spring 58 is secured at its left end to the mid section 242 of the caliper arm 18'. Each of the three prongs of the spring 58 bears against one of the three ratchet wheels 55', 56' or 57' and acts as a stop to prevent rotation of the ratchet wheel backwards, thus ensuring that the count of the counter will only increase.

The three number-bearing wheels 55-57 and their respective ratchet wheels 55'-57' are identical to one another. Each ratchet 55'-57' has ten teeth. Wheel 55 counts digits; wheel 56 counts once every ten digits; and wheel 57 counts once every hundred digits. Thus, the counter 252 can count up to 999 before being reset to zero.

As it is shown in FIG. 10, each wheel 55-57 has a notch 55a or 56a or 57a which forms a ratchet tooth in its upper edge.

When the tape is played, the diameter of the tape roll 263 increases and the caliper arms are spread apart. As this happens, the arm 52 tangentially pulls against a tooth on ratchet wheel 55' to rotate the wheel 55 by the distance of one tooth to record a count of one. Arm 53 similarly is urged toward the ratchet teeth on the "10's" numeral wheel 56, but rides on the upper edge of wheel 55 and is thus prevented from entering the ratchet teeth of the ratchet wheel 56 to pull the wheel 56 forward one notch until the toothed end of arm 53 falls into the one ratchet tooth 55a on the upper edge of wheel 55. This occurs every ten digits. The same mechanics then apply to arms 53 and 54 and wheels 56 and 57, except that actuating arm 54 includes a lug 59, which rides on the back of actuating arm 53. This means that actuating arm 54 will not engage a tooth on wheel 57 until actuating arm 53 simultaneously engages a tooth on wheel 56. Therefore the wheel 57 remains stationary through the "90's" of any one hundred digits until it reaches "99", when all actuating arms mate with teeth so that all three counter wheels 55, 56 and 57 advance one notch simultaneously.

When the tape is rewound and caliper arms 17' and 18' are free to move inwardly, the actuating arms 52, 53 and 54 reset into the next ratchet tooth, as allowed by the single ratchet 55a-57a on adjacent counter wheels. The spring projections 58 prevent reverse rotation of the counter wheels.

The process will then be repeated as additional plays are counted.

The counter is adjacent the back edge 255 (See FIG. 2) of the cassette, and its count can be read through the window 253. The window 253 preferably includes a magnifying lens.

As it has been noted above, the preferred counting mechanism discussed above is highly advantageous in that the mechanism prevents false counting due to shifting of the tape reels in the casing or housing 1'. The reason for this is that the counter mechanism detects only differential movement by the caliper arms. This is due to the fact that the counter mechanism 252 is mounted on one of the caliper arms and the actuating arms 52-54 are mounted on the other. Thus, only rotation of the caliper arms away from one another drives the counter. Therefore, if the take-up spool moves in the direction X shown in FIG. 8, the caliper arms 17' and 18' both rotate about shaft 51 by approximately the same amount, since each arm is urged against and follows the outer surface of the roll 263 of tape on the take-up reel. Since this causes no differential movement of the arms, the counter mechanism is not driven.

Since both of the caliper arms bear against the tape roll at about its greatest dimension, any movement of the roll in the "Y" direction creates negligible differential movement of the caliper arms and no false counting.

Another advantage of the use of the caliper arms is that because the diameter of the tape roll 263 is detected instead of the radius, the motion created by a given amount of tape motion is twice the relative motion created when only one roll size detector is used. This increase in motion constitutes an improvement over such systems as disclosed in either U.S. Pat. Nos. 4,466,584 or 3,995,319, since the devices disclosed in these patents are capable only of detecting the radius of the tape wound on the spool. Thus, the present invention provides for simpler, more direct and more accurate counting.

SPOOL BRAKE

The video cassette of the present invention preferably includes a new spool brake assembly of inventive design to fit the restricted space in the cassette. With reference now to FIGS. 8, 13, 14 and 15, the spool brake 80 includes arms 81 and 82, which pivot on a post 83 which, as it is shown in FIG. 14, is formed integrally with the bottom wall 259 of the cassette housing.

The upper end of the post 83 fits into a hole 91 in a boss 92 extending downwardly from the top wall 257 of the housing 1'. (Neither the top wall 257 nor the bottom wall 259 is shown in FIG. 13).

Figure 13:
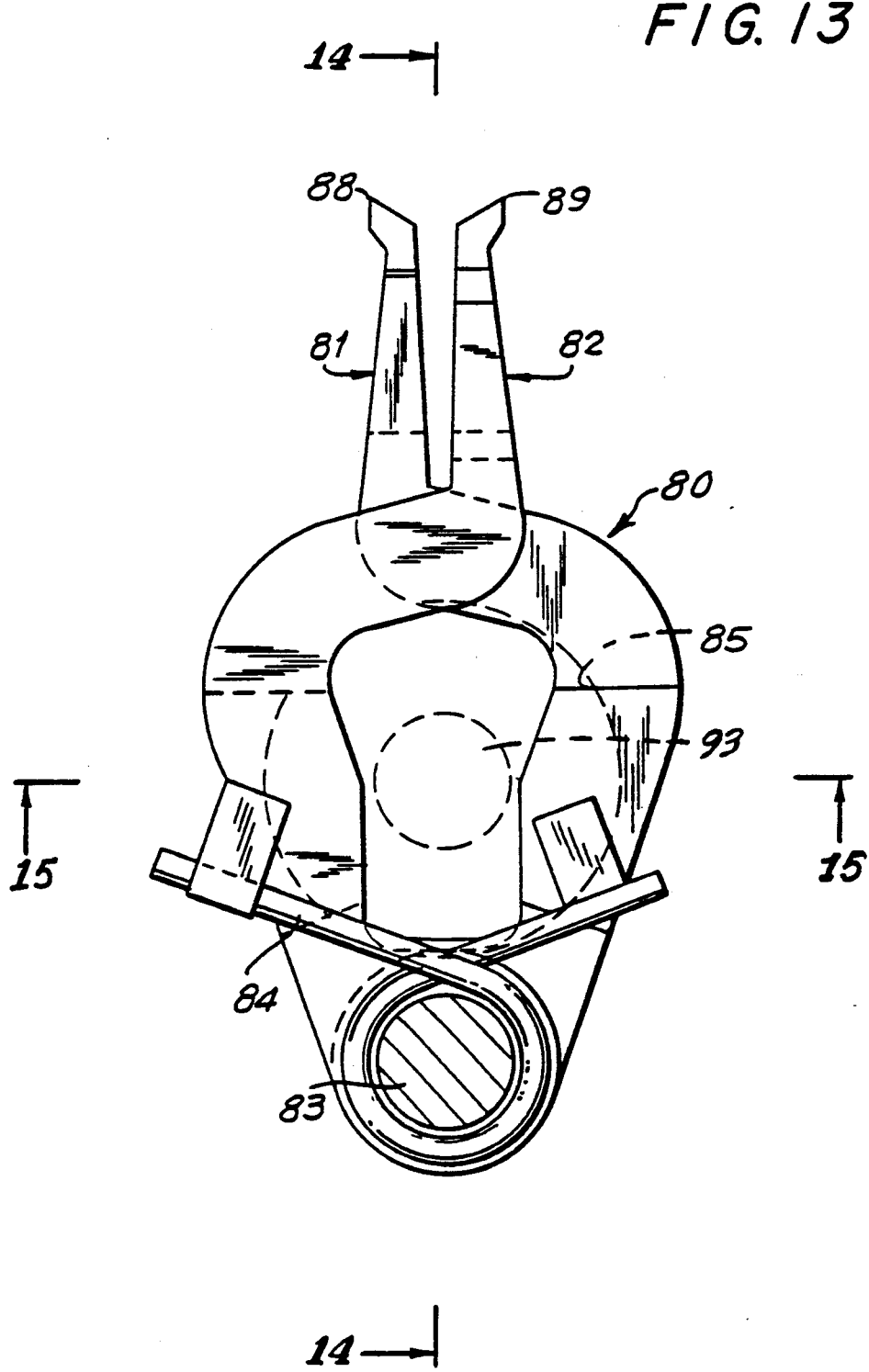
FIG. 13 is an enlarged top plan view of the tape spool brake depicted in FIG. 8.
Figure 14:
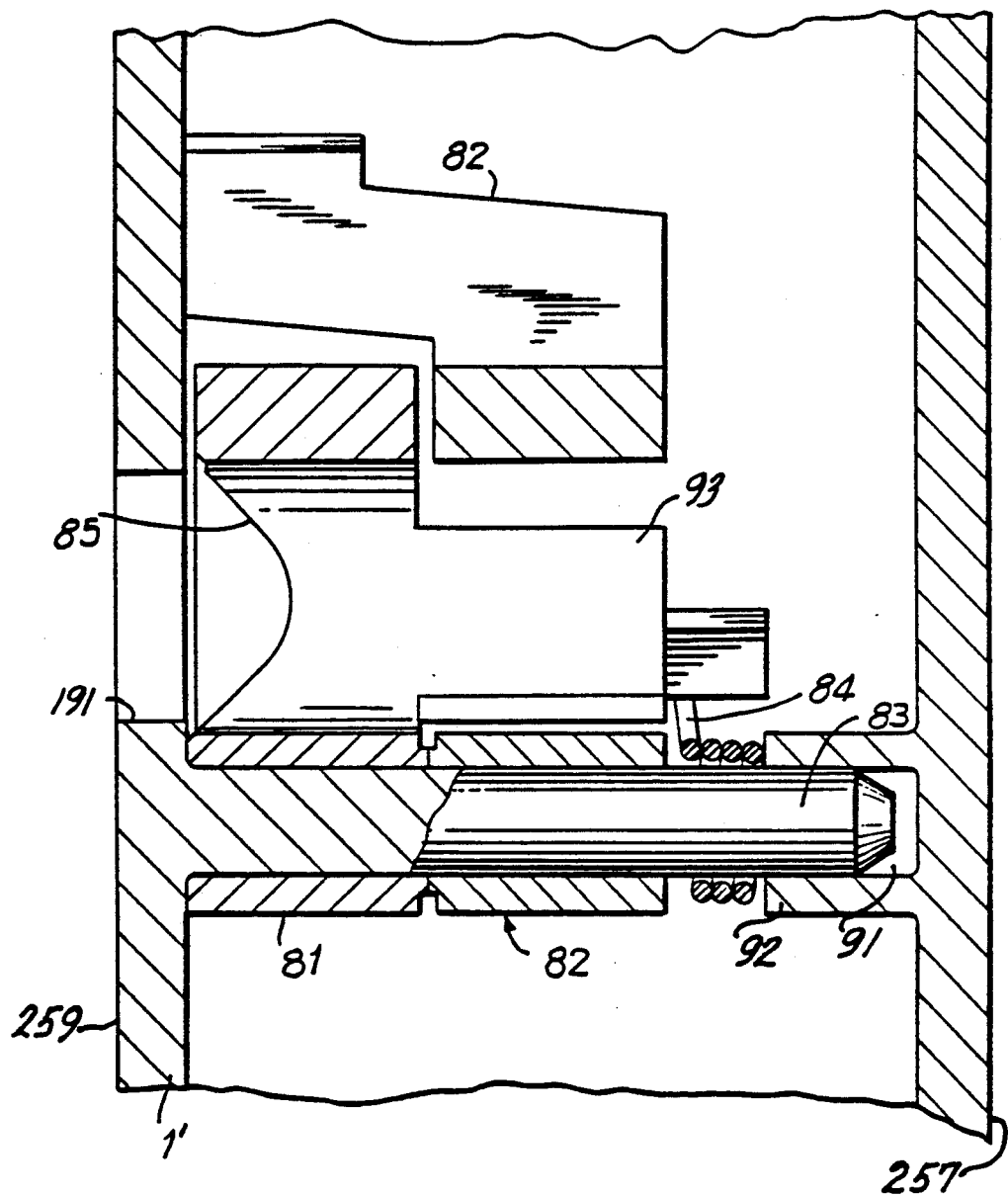
FIG. 14 is a cross sectional view, taken along the line 14—14 of FIG. 13, of the tape spool brake depicted in FIGS. 8 and 13, with a portion of the cassette casing.
Figure 15:
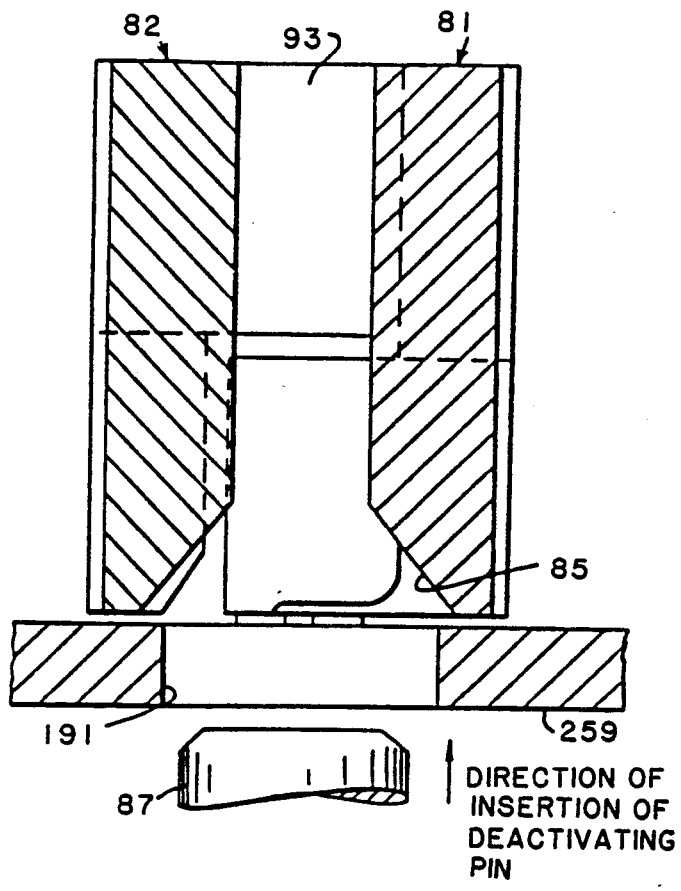
FIG. 15 is a cross sectional view, taken along the line 15—15 of FIG. 13, of the tape spool brake depicted in FIGS. 8 and 13, with a portion of the cassette casing.

As it is shown in FIGS. 13 and 14, arms 81 and 82 pass over each other in scissor-like fashion. The ends of the arms form teeth 88 and 89 shaped to engage the sprocket teeth or castellations 90 (FIG. 8) in the edges of the base disks of each of the tape spools. Arms 81 and 82 are urged by a torsion spring 84 away from one another and into engagement with the teeth 90 so as to engage the brake 80 and prevent the tape spools from rotating while the cassette is outside of a tape player.

As it is shown in FIGS. 13 and 14, a hole 191 is provided in the bottom wall 259 of the cassette housing. Aligned with the hole 191 is a hole 93 between the arms 81 and 82. The lower edge of the hole is beveled at 85 to facilitate insertion of a pin into the hole 93.

When the cassette is loaded into a VCR machine, a brake deactivating pin 87 in the VCR is inserted into the hole 191. The diameter of the hole 93 is substantially less than the outer diameter of the pin 87. Therefore, the pin 87 wedges the brake arms apart. This holds the teeth 88 and 89 away from the spools and keeps the brake disengaged while the cassette is in the VCR. The brake 80 permits rotation of the spools only when the cassette is inside a VCR.

While the foregoing description has been couched in terms of mechanical counting, counting may nevertheless be achieved electro-mechanically, electrically electronically, or, indeed, by any feasibly means. For example, the inventive device may utilize the crenellations that are provided on a tape reel to facilitate braking operation; a capacitive sensor and an IC Logic chip sense movement in a particular frequency band which covers the range of speed consistent with play mode. Rewind frequency produces the signal to provide a null or unity input. Upon threading tension, a second sensor energizes the circuit. A timer chip pre-set to program duration is triggered by the logic chip and times out the total play frequency duration, producing a threshold signal to display via the logic chip adding the appropriate count to the display when the cassette is rewound or removed from the cassette player. The total tape plays are recorded and/or displayed for the hire period and the progressive total for the cassette is stored for retrieval by the owner.

Memory output may be visual or electronic however, preferred is direct reading by computers. When a cassette is returned and "plugged in" to the shop's computer which outputs data like title, number of plays, etc. The computer calculates hire charge from data on royalty, cost recovery or the like. Hirer's account is debited and royalty transferred. Total tape wear is accurately known since total footage past the heads is known.

ELECTRONIC COUNTING/READOUT

FIG. 16 is a schematic diagram of an electronic counting and readout system 270 which detects the tape roll size changes, converts those changes into play counts, stores those counts electronically and displays them electronically in a machine-readable format. The count can be read into one of the rental computers 112 by means of a bar code reading "wand" 290. If desired, the mechanical counter also can be used to give a count readable by humans.

The means used to detect the tape roll size changes is that described above and shown in FIGS. 8-12. This mechanism drives the mechanical counter 252 (FIG. 2) to give a count which can be read by humans. In addition, mounted in the cassette housing 1' are a pair of switch contacts 272 and 274, a CMOS microprocessor chip 280, an EEPROM chip 284, a battery 282, a switch 286 and a light-emitting-diode ("LED") array 288.

The spring arm 58 which is used to prevent reverse rotation of the "units" ratchet wheel 55' (also see FIG. 10) is used as a flexible contact member which acts with the contacts 272 and 274 to produce an electrical count-indicating signal and deliver that signal over lines 278 to the microprocessor 280. When the arm 58 is fully engaged in one of the notches in the ratchet wheel 55, it is at its uppermost position and makes contact with contact 272.

As the ratchet wheel 55' rotates, the tooth 276 against which the arm 58 bears starts to bend the arm 58 away from contact 272. At the position shown in FIG. 16, the arm does not make contact with either contact 272 or 274.

At a pre-determined position, e.g., three-fourths of the way through its downward deflection, arm 58 reaches contact 274. The microprocessor 280 is programmed to have an "AND" function at its input so that a count signal is developed only when two signals have been received due to the opening of contact 278, and the other due to the closing of contact 274. The microprocessor is programmed to count these signals and store the count in the EEPROM. The count is sent over a line 283 to a LED array 288 which converts the count into a pattern readable by the bar code reader wand 290.

The LED array 288 also displays the cassette identification information which is permanently stored in the EEPROM 284. Thus, the array 288 displays both the identification information and play count in machine-readable form so that both sets of data can be read with a single application of the bar code reader wand 290.

The LED array 288 emits light of the same wavelength as that emitted by the wand 290. The LED array pulses in a pattern which simulates the alternating light and dark bands sensed by the wand when it sees an ordinary bar code.

Because the battery 282 should be small and should last a very long time without replacement, the microprocessor 280 is programmed to disconnect the battery 282 automatically when it has not received an input signal for a certain length of time, indicating that the cassette is not being played or scanned. However, the data stored in the EEPROM 284 is not lost and remains stored even after the power is turned off. The contacts 272 and 274 remain energized at all times, but create no power drain unless the microprocessor is powered up.

When one of the switch contacts 272 and 274 is opened or closed, the microprocessor powers up and is ready to operate.

A switch 286 is provided in the cassette to power-up the microprocessor when it is desired to read out the count, etc. from the cassette. The switch 286 can be a simple pressure-operated switch which is accessible at the outside of the cassette and can be operated by simply pressing it with a finger, pencil, or the tip of the wand 290, or any other handy object.

Alternatively, the switch 286 can be a photo-cell switch operated in response to receipt of light emitted by the wand 290.

It should be understood that the system 270 makes a separate character reader 111 (FIG. 1) unnecessary for reading the count into the computer 112 because a single bar code reader 116 will suffice.

The above described electronics can be run on a watch battery or rechargeable cell.

Thus it will be realized that the inventive means to automatically count the number of times that pre-recorded material has been played, or substantially played, may take several forms, as:
  (a) sensing tape "play" tension against time;
  (b) sensing spool rotation against time;
  (c) sensing number of spool rotations electronically;
  (d) sensing tape movement by capacitance against time; that is to say, footage played;
  (e) sensing electromagnetic radiation of player against time.

There again, change in diameter of a tape reel may equally well be sensed optically, magnetically, by capacitance, etc.

It is further contemplated that the present invention will actively encourage all distributors to ensure that all video copies of new films and all new copies of old films are made on cassettes with built-in counters, as such is very much in their own interests. There again, purchasers of new cassettes, whether pre-recorded or blank, may well regard a counter as a desirable "extra", enabling them to keep track of tape and/or head wear.

Installation of the inventive counters will permit all supplies of new and replacement cassettes to be based on fee-per-use contracts, thus making the proposition highly attractive to video shop operators by substantially reducing their initial outlay and so allowing them to carry more copies of successful films and a greater variety of films in general.

It is envisaged that the first application of this invention will be to the licensing for use and renting of video cassettes, but that subsequent applications will include all electronic, electromagnetic and light-spectrum recording media.

Although this invention has been described above with reference to video cassettes, the principles thereof are equally applicable to audio cassettes and cartridges and the like.

From the above-going, those skilled in the art will readily appreciate that video cassettes incorporating counting devices according to the present invention will provide the public with a new or much-improved article or, at the very least, offer to it a useful and attractive choice.

Although the invention has been described above with reference to examples and to preferred embodiments, it will be appreciated that the invention may be embodied in other forms or carried out in other ways without departing from the spirit or essential characteristics thereof. The above description is therefore to be considered in all respects, illustrative and not restrictive, and all changes which come within the meaning and range of equivalency are intended to be embraced therein.

I claim:

1. A video tape cassette with integral means for counting and indicating the number of times the tape has been played, said cassette comprising, in combination, a housing; a tape dispensing reel and a tape take-up reel rotatively mounted in said housing, said reels being relatively free to move about laterally in said housing when said cassette is not engaged in a video tape playing machine; a counter, and detecting means for detecting changes in the size of one of the rolls of tape on one of said reels and driving said counter to indicate one plate in response to a predetermined change, and for substantially neutralizing the effect on said detecting means of lateral movement of said reels in said housing, said detecting means comprising means for detecting the positions of two substantially opposite sides of a tape roll on one of said reels, and driving said counter to a degree corresponding to the change in the distance between said positions.

2. A cassette as in claim 1 in which said detecting means comprises a pair of followers to follow the surface of said one tape roll, said followers comprising a pair of arms embracing said roll and biased against the outer surface of said roll, said arms being pivoted to said housing adjacent one end, said means for driving said counter comprising means coupled to one of said arms driving said counter which is coupled to another of said arms.

3. A video tape cassette with integral means for counting and indicating the number of times the tape has been played, said cassette comprising, in combination,
  a housing:
  a tape dispensing reel and a tape take-up reel rotatably mounted in said housing, detecting means for detecting changes in the size of one of the rolls of tape on one of said reels and driving said counter to indicate one play in response to a predetermined change, said detecting means comprising means for detecting the positions of two substantially opposite sides of a tape roll on one of said reels, and driving said counter to a degree corresponding to the change in the distance between said positions.

4. A cassette as in claim 3 in which said detecting means comprises a pair of followers to follow the surface of said one tape roll, said followers comprising a pair of arms embracing said roll and biased against the outer surface of said roll, said arms being pivoted to said housing adjacent one end, said means for driving said counter comprising means coupled to one of said arms driving said counter which is coupled to another of said arms.

5. A video tape cassette with integral means for counting and indicating the number of times the tape has been played, said cassette comprising, in combination, a housing:

a tape dispensing reel and a tape take-up reel rotatably mounted in said housing, detecting means for detecting changes in the size of one of the rolls of tape on one of said reels and driving said counter to indicate one play in response to a predetermined change, detecting means in said housing for detecting movement of said tape, and signal means for providing an electrical signal each time that a predetermined amount of tape has been moved, and electronic counting means for counting said signals and providing an indication of the total count.

6. A cassette as in claim 5, including electrical storage means in said cassette for storing said count, said storage means being adapted to retain its stored data when not supplied with electrical power, said storage means containing unique cassette identification data, and display means for retrieving from storage and displaying said count and said identification data.

7. A cassette as in claim 5, said counting means including a ratchet wheel with a flexible stop member for stopping the return rotation of said wheel, contact means for detecting the flexing of said stop member when traversing one tooth on said wheel, including one break contact and one make contact, the sequential operation of which together indicate a count of one.

8. A cassette as in claim 5 in which said counting means includes a programmed microprocessor, a nonvolatile memory, and a battery.

9. A cassette as in claim 5 including electrical storage means in said cassette for storing said count, and electrical display means for displaying said count.

10. A cassette as in claim 9 in which said display means comprises a LED array adapted to simulate the light signals received by a bar code scanner.

11. A cassette as in claim 5 including a battery for energizing said signal means and means for disconnecting said battery from said signal means at all times other than when said signal means is operating.

12. A cassette as in claim 11 including switch means operable from without said housing for connecting said battery to said signal means and enabling the indication of said count.

* * * * *